Figure 1:
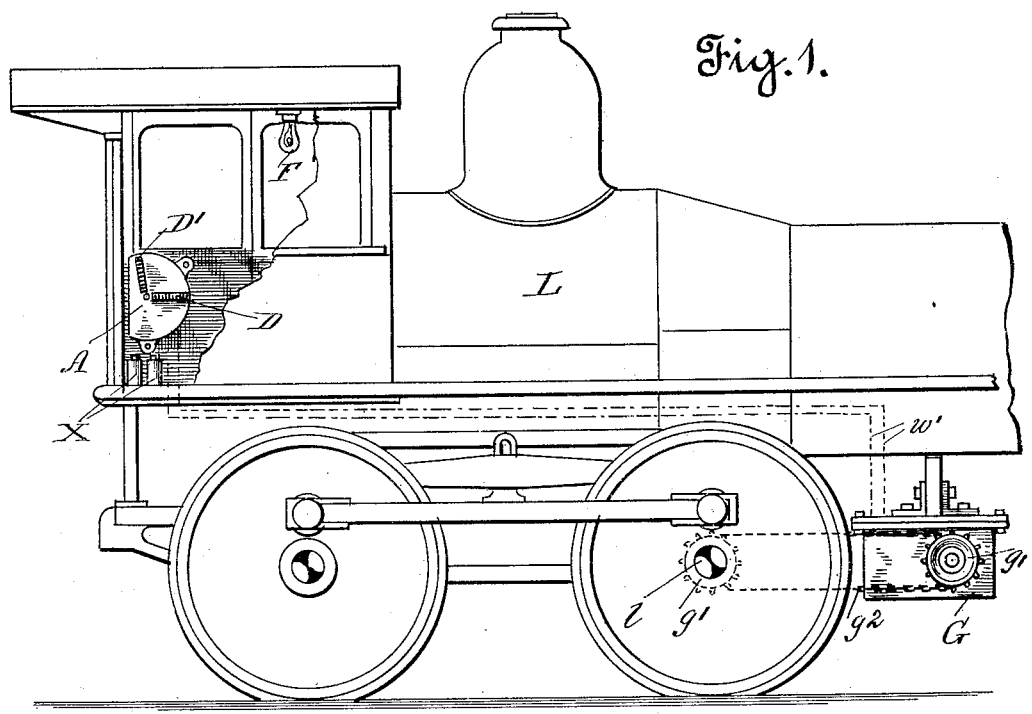

No. 703,057. Patented June 24, 1902.
L. F. GRAHAM.
RAILWAY INDICATOR.
(Application filed Mar. 11, 1902.)

(No Model.) 2 Sheets—Sheet 1.

Witnesses.

Inventor.
Lozelle Forbes Graham
by Wm. F. Booth
his Attorney.

No. 703,057. Patented June 24, 1902.
L. F. GRAHAM.
RAILWAY INDICATOR.
(Application filed Mar. 11, 1902.)
(No Model.) 2 Sheets—Sheet 2.
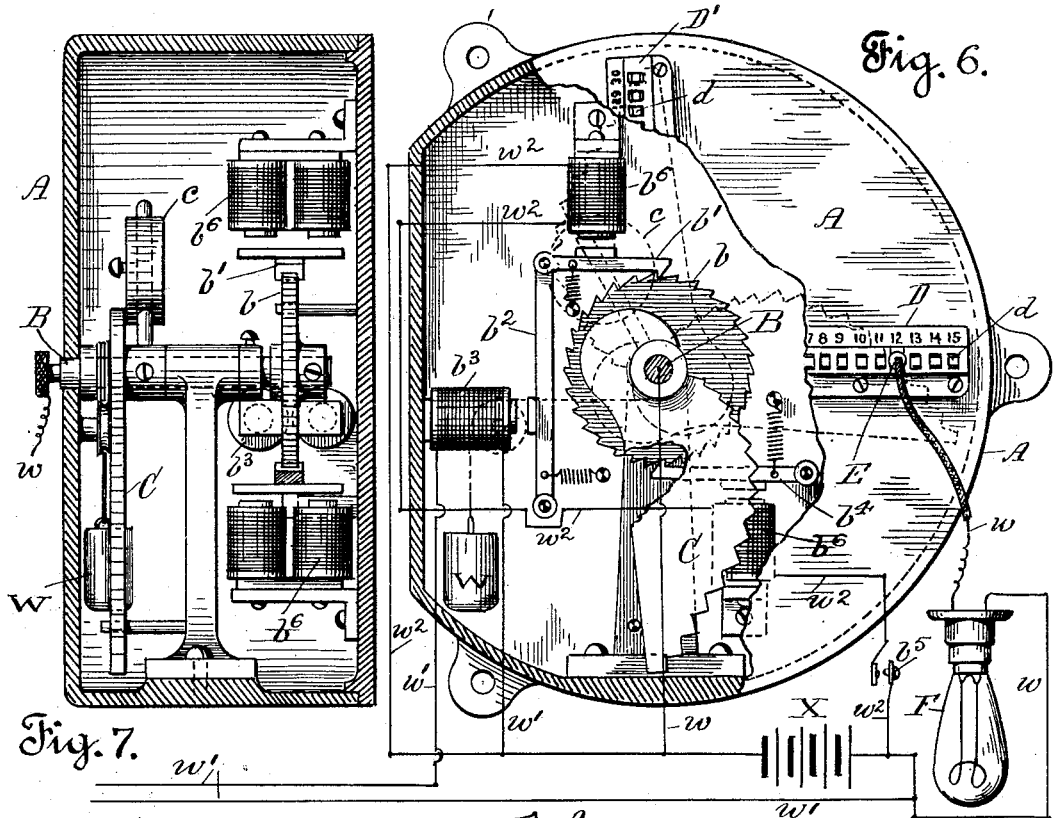
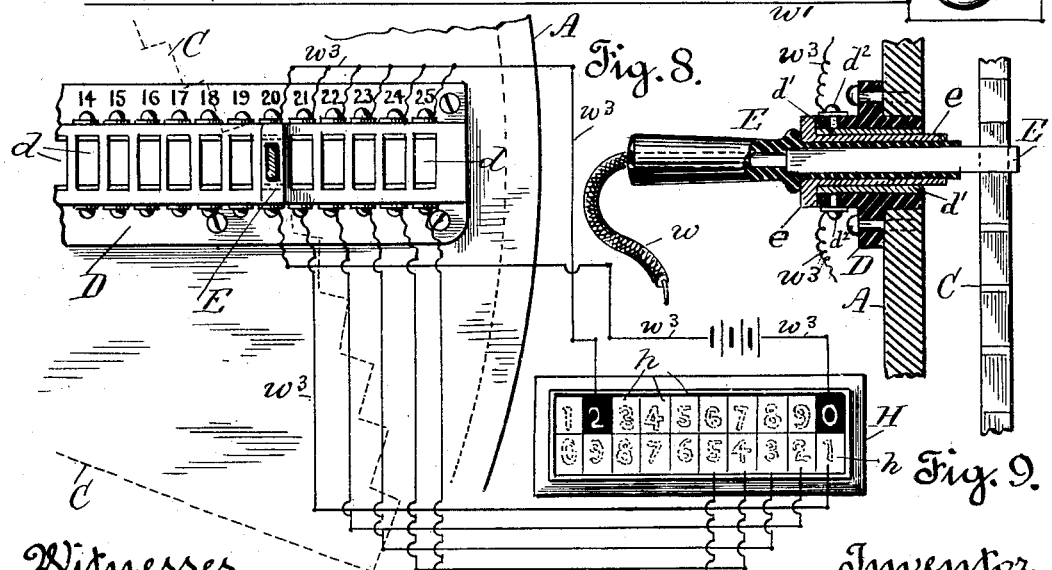

UNITED STATES PATENT OFFICE.

LOZELLE FORBES GRAHAM, OF SAN JOSE, CALIFORNIA.

RAILWAY-INDICATOR.

SPECIFICATION forming part of Letters Patent No. 703,057, dated June 24, 1902.

Application filed March 11, 1902. Serial No. 97,791. (No model.)

*To all whom it may concern:*

Be it known that I, LOZELLE FORBES GRAHAM, a citizen of the United States, residing at San Jose, county of Santa Clara, State of California, have invented certain new and useful Improvements in Railway-Indicators; and I do hereby declare the following to be a full, clear, and exact description of the same.

My invention relates to the class of railway-indicators. It is especially adapted for the use of locomotive-engineers to warn the occupants of the cab of the necessity of observing at certain points in the run previously-given orders, thus obviating the consequences of forgetfulness, inattention, or failure of observation from any cause. To illustrate: Let it be supposed an engineer has orders to meet a coming train at a certain siding a given number of miles away. It may happen from many causes that he fails to observe these orders and overruns the siding. He may forget, he may be inattentive at the moment he should be least distracted, or on account of darkness and the inconspicuousness of the siding he may not be able to ascertain his bearings until too late. In any case it is the object of my invention to signal his attention at the proper moment by requiring him upon the receipt of his orders to immediately set his indicator so that when the given number of miles is reached notice of the fact will be given him with certainty and independent of any further act on his part.

My invention further contemplates a check upon him in the way of providing that his very act of setting his indicator and the accuracy of his act shall be announced to the conductor, who, having received counterpart orders to those given to the engineer, will be able to note the failure of such setting or its inaccuracy.

My invention consists in general terms of a distance-meter actuated by the travel of the vehicle, means actuated by said meter for indicating the distance traveled, and means under the control of the operator for obtaining said indication at any predetermined distance traveled by the vehicle.

It further consists, in connection with the features just mentioned, of a means separately indicating the selection by the operator of such predetermined distance.

More specifically, my invention consists in an indicator mechanism the setting of which is under the control of the engineer, said mechanism comprising a revoluble contact-arm driven by a distance-meter, such as a cyclometer mechanism, whereby the movement of the arm is timed in terms of distance traveled by the locomotive—that is to say, the arm movement is proportionate to the miles traveled by the train—a fixed support adapted to receive at predetermined distances in its length a contact-peg which lies in the path of the arm, whereby the latter will make contact with the peg at various points determined in terms of the distance traveled, an electric circuit in which the arm and peg form poles, and a suitable signal operated by the closing of said circuit and adapted to call the engineer's attention at the proper time.

In connection with this indicator my invention further consists of an annunciator, one or more in the car or cars of the train, which by suitable electric circuits closed by the insertion of the peg of the indicator is adapted to notify the conductor that the engineer has correctly set his indicator.

My invention further consists in the novel construction, arrangement, and combination of parts which I shall now describe by reference to the accompanying drawings.

Figure 2:
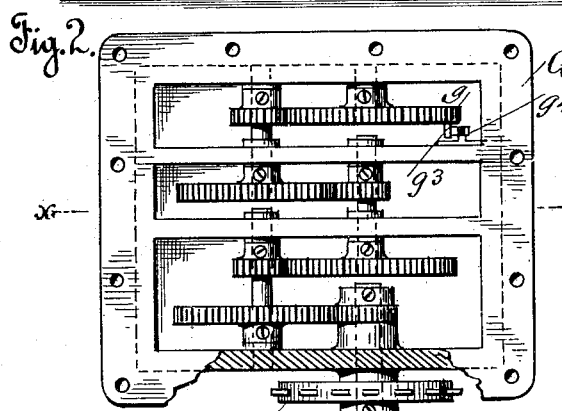
Figure 4:
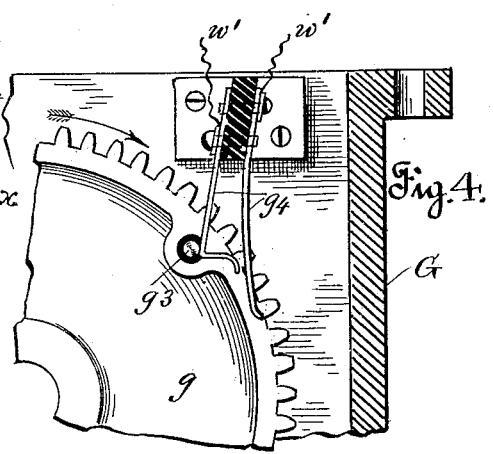
Figure 3:
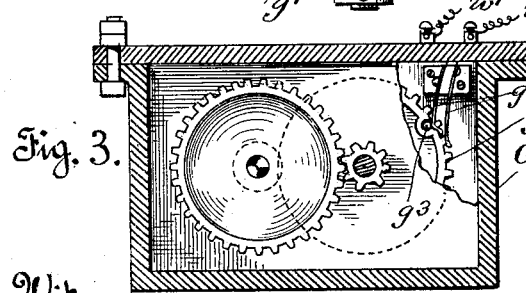
Figure 5:
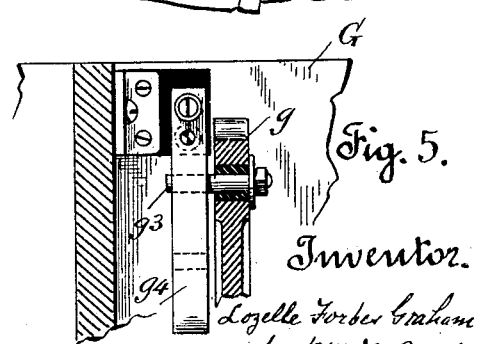

Figure 1 is a partial view of a locomotive, showing the principal parts of the indicator in their general relative arrangement thereon. Fig. 2 is a plan, partly broken, of the distance-meter or cyclometer G with the top plate removed. Fig. 3 is a section, partly broken, on the line *x x* of Fig. 2. Fig. 4 is a detail showing the circuit-closing function of cyclometer-wheel *g*. Fig. 5 is an edge view of same. Fig. 6 is a partly-broken sectional elevation of the interior and exterior of the indicator A, showing also the lamp F and the several electric circuits. Fig. 7 is a vertical section of the indicator A. Fig. 8 is a diagrammatic view showing the means for electrically operating the annunciator H by the insertion of the peg E in its support. Fig. 9 is a sectional detail of contact-peg E in its support D and showing the contact-arm C in relation to the peg and indicating the manner in which said peg is adapted to close the circuit to the annunciator.

A, Fig. 1, is a casing within convenient reach of the engineer. It is here shown in the cab of the locomotive L. Within this casing is a shaft B, Figs. 6 and 7, upon which is firmly fixed the contact-arm C, which by the rotatory movement of the shaft is caused to describe a movement in the arc of a circle. This arm is so shaped that different points in the length of its contact edge, counting from its axis to its free extremity, shall arrive at a given plane at successively later times. To do this, its contact edge is made cam-like or eccentric, as seen in Fig. 6, and said edge, though it may be continuous or unbroken, is preferably notched out, as shown, to better accentuate the predetermined successive contact divisions and afford a better mechanical and electrical contact with the contact-peg to be presently described. These predetermined contact divisions are proportionate to or expressed in terms of distance traveled by the locomotive—say, for example, miles.

Upon the exterior of the casing A is a support which may assume the form of a bar D, Fig. 6. This bar lies in the plane of the radius of the arc described by contact-arm C, as seen in Fig. 6. In said bar or support is made a series of holes $d$, which from the inner end outwardly are spaced correspondingly to the contact divisions of the arm and are numbered from "1" to any number—say "15"—as seen in Fig. 6.

E is a contact-peg, Figs. 6, 8, and 9, which is adapted to fit into any of the holes $d$, and when so fitted its inner end projects into the interior of casing A and lies in the path of the contact-arm C, as is shown in Fig. 9.

X, Figs. 1 and 6, is an electric battery, and $w$ $w$ are the wires of an electric circuit which includes the contact-arm C and the contact-peg E as poles, the wire to the former extending to the shaft B, as in Figs. 6 and 7, on which the arm is mounted, and the other wire extending to the peg. This circuit $w$ $w$ also includes a suitable alarm or signal device—such as a bell, a lamp, or other such electrically-operated means capable of giving a signal of any character. I have here shown in Figs. 1 and 6 for the sake of illustration a lamp F, which will be so located in the cab, as in Fig. 1, as to attract the engineer's attention.

Now it is obvious from the foregoing description that if the peg E be fitted into any of the holes $d$ and if the arm C be then revolved it will make electrical contact with the peg, thereby closing circuit $w$ $w$ and lighting the lamp F, whereby the engineer's attention is attracted. It is further apparent that the time of this circuit-closing contact of arm and peg is dependent upon the position of the peg in its support, being sooner if the peg be nearer the axis of the arm and later if farther removed. Now if this contact be expressed in miles, so that when the locomotive has traveled one mile the one-mile-contact division of the arm shall be brought up to the plane of the peg and if said peg be in the one-mile hole of its support, then the signal will be given when one mile has been traveled. Likewise with other numbers of miles. For example, if the peg be set in the twelve-mile hole, as in Fig. 6, it will require the locomotive to travel twelve miles before the twelve-mile-contact division of arm C reaches the peg, thereby closing the circuit and giving the signal. It is consequently within the power of the engineer to so set the peg E as to give him the signal at any number of miles. Now in order to move the arm C in terms of distance I actuate it by a suitable distance-meter—such, for example, as a cyclometer mechanism. This I indicate in Fig. 1 by the casing G, the interior gearing of which is shown in Fig. 2, but needs no other explanation than to point out that the final wheel $g$ of the mechanism is to make one complete revolution for each mile of travel of the locomotive L. I indicate in Fig. 1 the connection of the cyclometer with the axle $l$ of the locomotive by the sprockets $g'$ and endless chain $g^2$. The mile revolution of cyclometer-wheel $g$ is to be transmitted in suitable manner—as, for example, electrically—to the shaft B. One means for effecting this is as follows: On the shaft B is a ratchet-wheel $b$, Figs. 6 and 7. With this ratchet-wheel an actuating-pawl $b'$ engages, said pawl being jointed to an armature $b^2$, Fig. 6, of an electromagnet $b^3$. On the cyclometer-wheel $g$ is a stud $g^3$, Figs. 3, 4, and 5, which when the wheel has made a revolution comes into contact with and presses together the circuit-closer springs $g^4$ and closes an electric circuit represented by wires $w'$ $w'$, which include the magnet $b^3$. It will now be seen that when the locomotive has traveled one mile the pawl $b'$ will turn the ratchet-wheel $b$ one notch, and this movement is proportioned to so turn shaft B as to move the arm C so that the one-mile contact division of said arm will reach the plane of the peg. Likewise when twelve revolutions of cyclometer-wheel $g$ have been accomplished the shaft B will have been turned through a sufficient arc to carry the twelve-mile contact division of the arm C to the plane of the peg. A retaining-pawl $b^4$ also engages the ratchet-wheel, Fig. 6. In order to return arm C to the starting-point after it has accomplished the object of its movement, there is an electric circuit $w^2$ $w^2$, which is closed by a switch at $b^5$, Fig. 6, under the control of the engineer. This circuit includes the electromagnets $b^6$, which serve to withdraw both the actuating-pawl $b'$ and the retaining-pawl $b^4$ from their engagement with the ratchet-wheel $b$, whereupon a suspended weight W, attached to the shaft B, Fig. 6, serves to turn said shaft with its arm C back again.

To make the shaft sensitive to rotary movement, it may be counterbalanced in any suitable manner. For this purpose I have shown a counterbalance or weight extension $c$ on the hub of arm C, Fig. 7. For the sake of compactness a second fixed peg-support or bar D', Figs. 1 and 6, may be used. It is so located with respect to arm C as to continue by the arrangement of its peg-holes the consecutive contacts of the arm therewith after said arm has passed the first peg-support D. Thus if the last mile contact on bar D is "15" the first on bar D' is "16", and the first contact of the arm will reach the plane of the first peg-hole on bar D' upon the completion of the last mile on bar D.

My invention contemplates a further function for peg E—namely, to announce to the conductor the fact that the engineer has set his indicator and that he has set it accurately. To accomplish this, there is an annunciator to be located in one or all of the cars of the train. This device may be of any suitable character. I have in Fig. 8 shown it as a casing H, with a series of numbered drop-shutters $h$. The peg E is constructed with a sleeve $e$, Fig. 9, insulated from the body of the peg and which when fitted in the holes serves through contact with metallic lining $d'$ and posts $d^2$ to close electric circuits represented by wires $w^3$ $w^3$, passing to the annunciator, Fig. 8. These circuits are properly arranged to drop the shutters corresponding to the number of the hole in which the peg is fitted. Thus if it be placed in the twenty-mile hole, as in Fig. 8, the shutters 2 and 0 will drop, and thereby indicate to the conductor not only the fact that the indicator has been set by the engineer, but whether or not the setting is accurate.

The operation complete is as follows: At a given station the engineer and conductor are handed the train-despatcher's orders in duplicate. They are to the effect to meet train No. 15 at Cayote siding. Both trainmen know that siding to be, say, twelve and one-half miles ahead. The engineer at once sets peg E in the twelve-mile hole, as in Fig. 6. This setting is known to the conductor by the annunciator H in the car, for, as stated, the placing of the peg in the hole electrically operates the annunciator, and the conductor can see that it is accurate. When twelve miles have been traveled, the arm C has made contact with the peg, and the light F gives the engineer notice that he is in the vicinity of the siding and fully recalls his orders. Then by closing circuit $w^2$ $w^2$ at switch $b^5$ the indicator is returned to its initial position.

As I have before stated, the means for warning the engineer of the distance traveled by the train may be of any suitable nature, or, as the essential feature is proper notice of the distance traveled, I do not confine my invention merely to warning the engineer, though this may be the practical means of securing the result.

My invention is to be extended to the accomplishment of the necessary act for which the indicator is intended, even though said act be an automatic one, such as releasing the air to set the brakes upon the accomplishment of the given number of miles or any other thing which the closing of the electric circuit expressed in terms of and dependent upon distance traveled may be set to do.

Having thus described my invention, what I claim as new, and desire to secure by Letters Patent, is—

1. In an indicator for traveling vehicles, the combination of a distance-meter actuated by the travel of the vehicle, means for indicating the distance traveled, electrically-operated devices for actuating said distance-indicating means from the distance-meter, and means under the control of the operator for obtaining said distance indication at any predetermined distance traveled by the vehicle.

2. In an indicator for traveling vehicles, the combination of a distance-meter actuated by the travel of the vehicle, means actuated by said meter for indicating the distance traveled, means under the control of the operator for obtaining said indication at any predetermined distance traveled by the vehicle, means separately indicating the selection by the operator of such predetermined distance, and electrically-operated devices for actuating said last-named means from the means under the operator's control.

3. In an indicator for railway-trains, the combination of a distance-meter actuated by the travel of the locomotive, means on the locomotive and actuated by said meter for indicating the distance traveled, means under the control of the engineer for obtaining said indication at any predetermined distance traveled by the locomotive, and means exterior to the locomotive for separately indicating to the conductor the selection by the engineer of such predetermined distance.

4. In an indicator for railway-trains, the combination of a distance-meter actuated by the travel of the locomotive, means on the locomotive and actuated by said meter for indicating the distance traveled, means under the control of the engineer for obtaining said indication at any predetermined distance traveled by the locomotive, means exterior to the locomotive for separately indicating to the conductor the selection by the engineer of such predetermined distance and electrically-operated devices for actuating said last-named means from the means under the engineer's control.

5. In an indicator for traveling vehicles, the combination of a distance-meter actuated by the travel of the vehicle, means for indicating the distance traveled, electrically-operated devices for actuating said distance-indicating means from the distance-meter, means under the control of the operator for obtaining said distance indication at any predetermined distance traveled by the vehicle, means separately indicating the selection by the operator of such predetermined distance, and electrically-operated devices for actuating said last-named means from the means under the operator's control.

6. In an indicator for traveling vehicles, the combination of a distance-meter actuated by the travel of the vehicle, means actuated by said meter for indicating the distance traveled, a signal and electrical connections for operating it from said last-named means, and means under the control of the operator for obtaining said indication and signal at any predetermined distance traveled by the vehicle.

7. In an indicator for traveling vehicles, the combination of a distance-meter actuated by the travel of the vehicle, means for indicating the distance traveled, electrically-operated devices for actuating said distance-indicating means from the distance-meter, a signal and electrical connections for operating it from said last-named means, and means under the control of the operator for obtaining said indication and signal at any predetermined distance traveled by the vehicle.

8. In an indicator for traveling vehicles, the combination of a distance-meter actuated by the travel of the vehicle, means electrically actuated by said meter for indicating the distance traveled, a signal electrically operated by said last-named means, means under the control of the operator for obtaining said indication and signal at any predetermined distance traveled by the vehicle, and electrically-operated means separately indicating the selection by the operator of such predetermined distance.

9. In an indicator the combination of a revoluble eccentric contact-arm, a fixed support disposed in the plane of a radius of the path described by the arm, a contact-peg adapted to be inserted in said support at various predetermined distances in its length, said peg lying in the path of movement of the arm whereby contact is made between the two at predetermined distances on the arm, an electric circuit in which said arm and peg form poles, and a signal operated by the closing of said circuit.

10. In an indicator for traveling vehicles, the combination of a revoluble eccentric contact-arm, a fixed support disposed in the plane of a radius of the path described by the arm, a contact-peg adapted to be inserted in said support at various predetermined distances in its length, said peg lying in the path of movement of the arm whereby contact is made between the two at predetermined distances on the arm, an electric circuit in which said arm and peg form poles, a signal operated by the closing of said circuit, a distance-meter actuated by the vehicle travel, and means operated by the distance-meter for revolving the arm.

11. In an indicator for traveling vehicles, the combination of a revoluble eccentric contact-arm, a fixed support disposed in the plane of a radius of the path described by the arm, a contact-peg adapted to be inserted in said support at various predetermined distances in its length, said peg lying in the path of movement of the arm whereby contact is made between the two at predetermined distances on the arm, an electric circuit in which said arm and peg form poles, a signal operated by the closing of said circuit, a distance-meter actuated by the vehicle travel, and electrically-operated means, actuated by the distance-meter for revolving the arm.

12. In an indicator for traveling vehicles, the combination of a revoluble eccentric contact-arm, a fixed support disposed in the plane of a radius of the path described by the arm, a contact-peg adapted to be inserted in said support at various predetermined distances in its length, said peg lying in the path of movement of the arm whereby contact is made between the two at predetermined distances on the arm, an electric circuit in which said arm and peg form poles, a signal operated by the closing of said circuit, a distance-meter actuated by the vehicle travel, and electrically-operated means actuated by the distance-meter for revolving the arm consisting of a ratchet-wheel on the axis of the arm, an actuating-pawl therefor, an electromagnet to operate the pawl, an electric circuit, and a circuit-closer operated by the distance-meter.

13. In an indicator for traveling vehicles, the combination of a revoluble eccentric contact-arm, a fixed support disposed in the plane of a radius of the path described by the arm, a contact-peg adapted to be inserted in said support at various predetermined distances in its length, said peg lying in the path of movement of the arm whereby contact is made between the two at predetermined distances on the arm, an electric circuit in which said arm and peg form poles, a signal operated by the closing of said circuit, a distance-meter actuated by the vehicle travel, electrically-operated means actuated by the cyclometer mechanism for revolving the arm consisting of a ratchet-wheel on the axis of the arm, an actuating-pawl therefor, an electromagnet to operate the pawl, an electric circuit, and a circuit-closer operated by the distance-meter, and means for resetting the arm consisting of an electromagnet to relieve the ratchet-wheel of its pawl, an electric circuit with a circuit-closer, and a weight to return the arm.

14. In an indicator, the combination of a revoluble eccentric contact-arm, a fixed support disposed in the plane of a radius of the path described by the arm, a contact-peg adapted to be inserted in said support at various predetermined distances in its length, said peg lying in the path of movement of the arm whereby contact is made between the two at predetermined distances on the arm, an electric circuit in which said arm and peg form poles, a signal operated by the closing of said circuit, an annunciator to indicate the position of the peg in its support and an electric circuit closed by the insertion of the peg and adapted to operate the annunciator.

15. In an indicator for traveling vehicles, the combination of a revoluble eccentric contact-arm, a fixed support disposed in the plane of a radius of the path described by the arm, a contact-peg adapted to be inserted in said support at various predetermined distances in its length, said peg lying in the path of movement of the arm whereby contact is made between the two at predetermined distances on the arm, an electric circuit in which said arm and peg form poles, a signal operated by the closing of said circuit, a distance-meter actuated by the vehicle travel, means operated by the distance-meter for revolving the arm, an annunciator to indicate the position of the peg in its support and an electric circuit closed by the insertion of the peg and adapted to operate the annunciator.

In witness whereof I have hereunto set my hand.

LOZELLE FORBES GRAHAM.

Witnesses:
 WALTER F. VANE,
 D. B. RICHARDS.